United States Patent [19]

Teramachi

[11] Patent Number: 4,595,244
[45] Date of Patent: Jun. 17, 1986

[54] RECIRCULATING-BALL LINEAR BEARING

[76] Inventor: Hiroshi Teramachi, 2-34-8, Higashi-Tamagawa, Setagaya-ku, Tokyo, Japan

[21] Appl. No.: 757,924

[22] Filed: Jul. 22, 1985

Related U.S. Application Data

[63] Continuation of Ser. No. 461,126, Jan. 26, 1983, abandoned.

[30] Foreign Application Priority Data

Feb. 13, 1982 [JP] Japan .................................. 57-21480
Feb. 13, 1982 [JP] Japan .................................. 57-21481

[51] Int. Cl.[4] .............................................. F16C 29/06
[52] U.S. Cl. .......................................... 384/15; 384/45
[58] Field of Search ....................... 308/6 C, 3.5, 6 R

[56] References Cited

U.S. PATENT DOCUMENTS 4,253,709  3/1981  Teramachi ........................... 308/6 C
4,273,389  6/1981  Takai .................................. 308/6 C
4,296,974  10/1981 Teramachi ........................... 308/6 C Primary Examiner—Stuart S. Levy
Assistant Examiner—Thomas R. Hannon
Attorney, Agent, or Firm—Armstrong, Nikaido, Marmelstein & Kubovcik

[57] ABSTRACT

A linear bearing capable of withstanding the load acting thereon in all of upward, downward, and opposite transverse directions as it rolls along a T-sectioned guide rail. Included is a body of inverted-U-shaped cross section having two opposed pairs of ball raceways formed longitudinally on its inner surfaces, with each pair of raceways vertically spaced from and angled toward each other. A ball return passageway extends longitudinally through the body in the adjacency of each raceway. A pair of end covers fastened to the opposite ends of the body are each segmented into a pair of lateral halves. Each half of each end cover has two hairpin passageways formed in its inside face, each for intercommunicating one raceway and one adjacent return passageway to allow recirculation of a group of antifriction balls therethrough. A pair of cages of W- or Z-shaped cross section extend along the respective pairs of raceways on the body for rollably holding the antifriction balls thereon. The cages are slotted to permit the balls to partly project therethrough for rolling engagement with raceways on the guide rail. The segmented end covers and the separate cages make easier the manufacture thereof to close tolerances.

9 Claims, 26 Drawing Figures

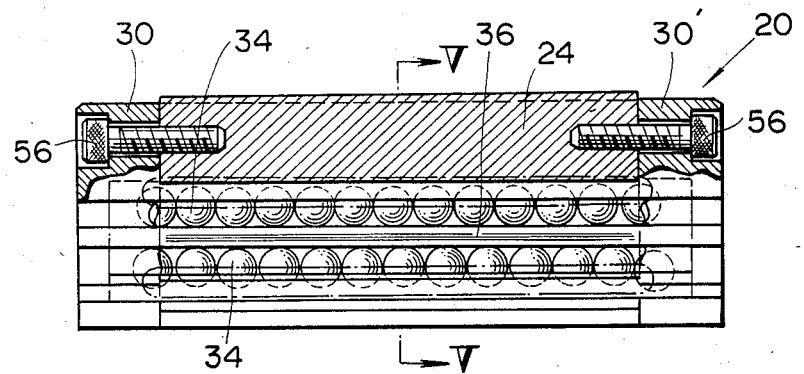
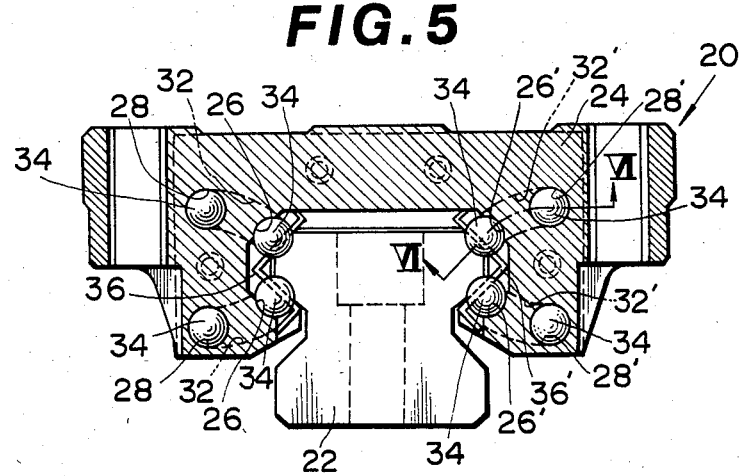
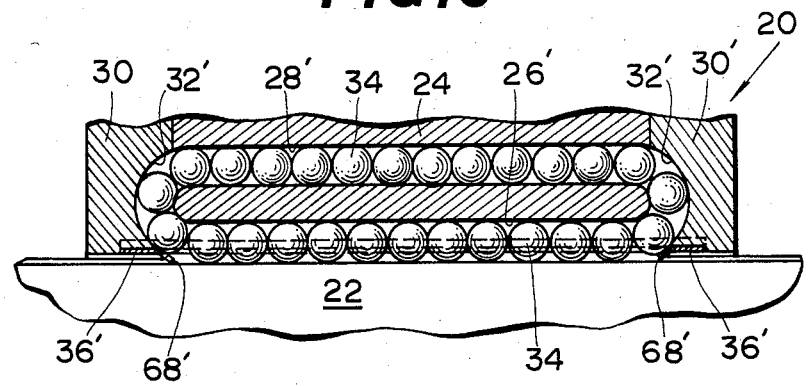

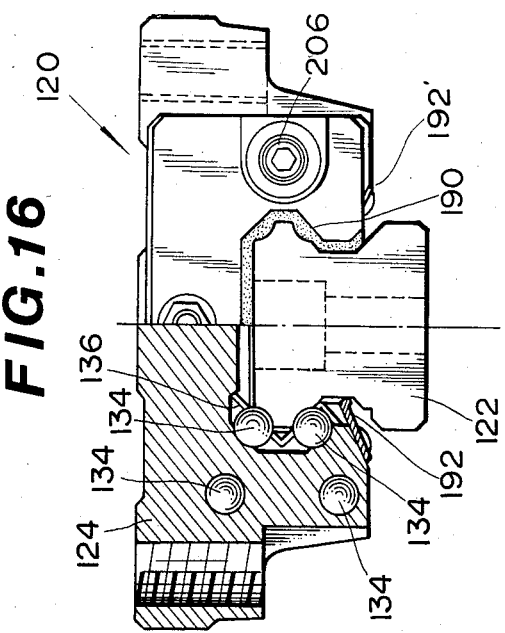
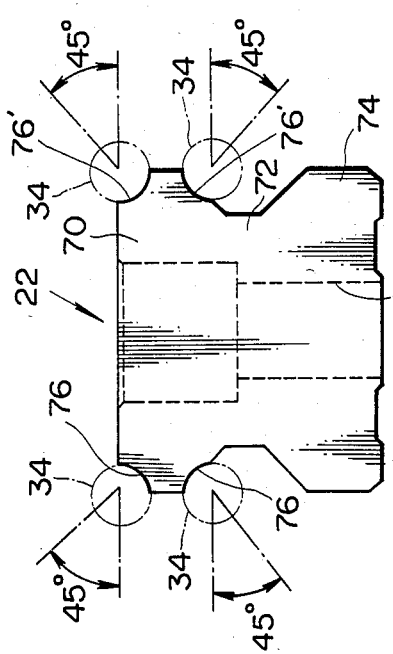
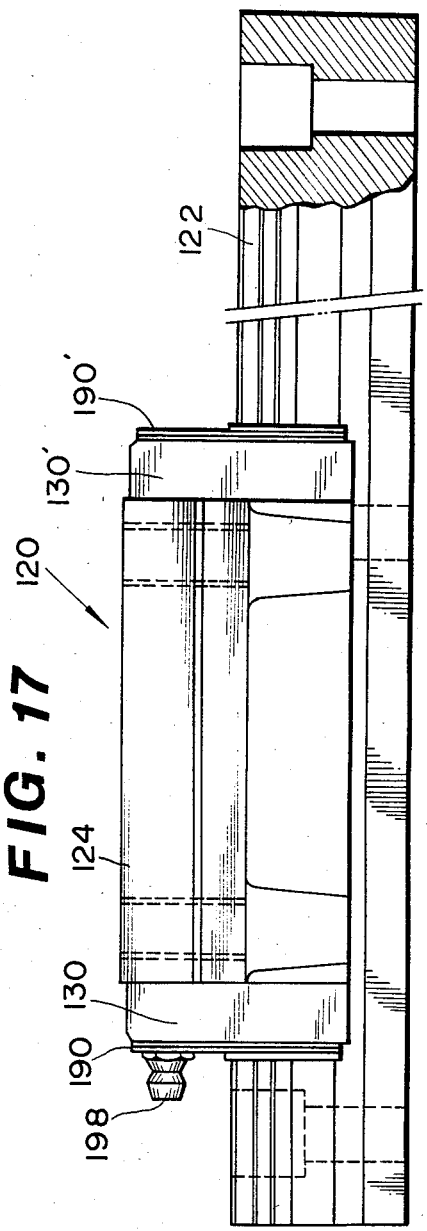

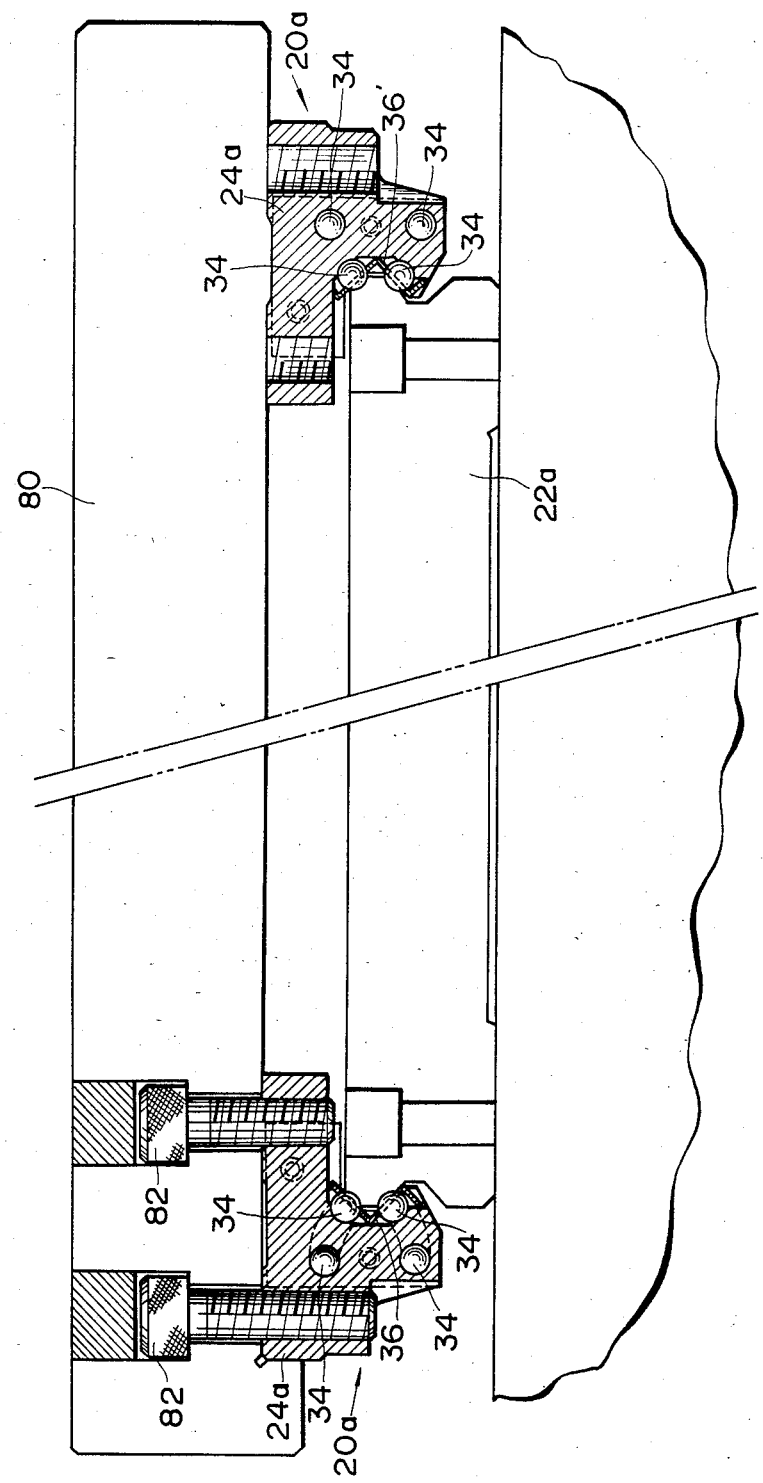

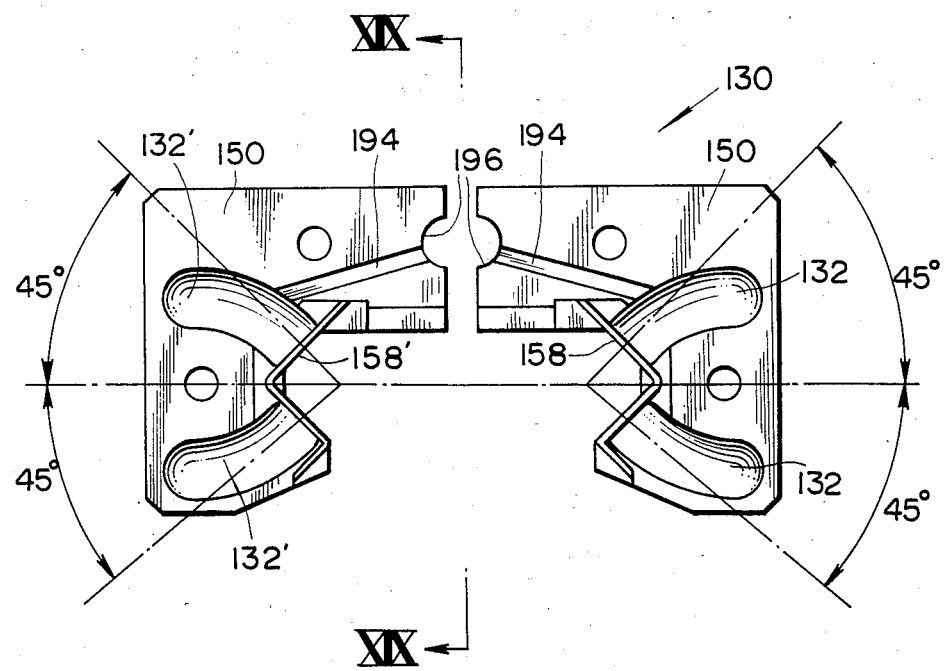
FIG. 18
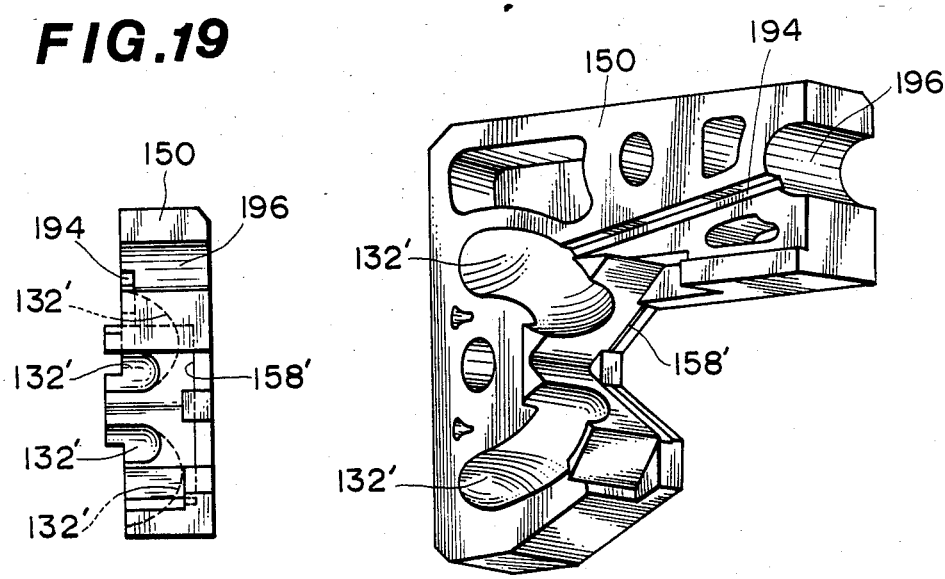
FIG. 19
FIG. 20

RECIRCULATING-BALL LINEAR BEARING

BACKGROUND OF THE INVENTION

This application is a continuation of application Ser. No. 461,126, field Jan. 26, 1983, now abandoned.

The present invention pertains to a linear bearing for use in moving an object along a rectilinear path, and more specifically to such a bearing of the type incorporating groups of recirculating balls for a minimum of friction and capable of withstanding the load acting thereon in all of downward, upward, and opposite transverse directions of the path equally well. The linear bearing in accordance with the invention finds applications in machine tools, machining centers, and a variety of other machines or equipment where one part is to be moved back and forth relative to another.

Japanese Patent Laying-Open No. 55-72912, filed by the assignee of the instant application, discloses a linear bearing of the type in question. It comprises a bearing body of inverted-U-shaped cross section mounted astride a guide rail via groups of recirculating antifriction balls for rolling movement thereon. Although this prior art linear bearing can largely well accomplish the purposes for which it is intended, it has proved to have certain problems in connection with some of its components.

One of the problems concerns the pair of end coners fastened to the opposite ends of the bearing body to provide parts of the closed paths for the recirculation of the antifriction balls. The end covers have heretofore been each integrally molded of plastics material. The integral molding of each end cover is objectionable because of its complex shape. Having approximately the cross sectional shape of the bearing body, the end covers have formed therein not only curved grooves serving as parts of the closed ball paths but also annular depressions and other recesses. Great difficulties have been involved in the fabrication of molds for such complex shapes and in the control of the heat and pressure conditions for the molding of the end covers therein. Some errors in the shape and size of the molded end covers have therefore been almost unavoidable, resulting in the impediment of the smooth rolling of the balls through the curved grooves in the end covers. The manufacture of such unitary end covers has also been very time-consuming and so added considerably to the cost of the complete bearing.

Another problem with the noted prior art linear bearing relates to its unitary cage rollably holding the antifriction balls on raceways formed on the inside surfaces of the bearing body. Horseshoe-shaped in cross section to fit the interior contours of the bearing body, the cage has slots formed longitudinally therein to allow the balls to make rolling engagement with the guide rail. The cage is made from sheet steel by means of a press. By reason of the complex shape of the cage, however, it has been difficult to create the slots in exact positions thereon. Difficulties have also been encountered in withdrawing the punches from the slots as they are formed in sloping parts of the cage.

The unitary construction of the conventional cage has also tended to give rise to its dimensional errors and mounting errors. Such errors make it impossible to rigidly hold the cage relative to the body and other pertinent parts of the bearing. Thus the manufacture of linear bearings of any great longitudinal dimension has been virtually inhibited. Further the unitary cage with the dimensional or mounting errors has been easy to deflect or become displaced under load, impeding the proper rolling of the antifriction balls and, in consequence, the proper movement of the bearing itself along the guide rail with a minimal rolling friction.

An additional objection to the unitary end covers and cage in the prior art bearing is their lack of adaptablity to guide rails and bearing bodies of varying widths. As bearing bodies and guide rails are made in several matching transverse dimensions, so the end covers and cage must also be manufactured in different sizes suiting the bearing bodies.

SUMMARY OF THE INVENTION

The present invention seeks to make easier, in a recirculating-ball linear bearing of the type defined, the fabrication of the pair of end covers and the cage to close tolerances by segmenting or splitting them and hence to reduce the manufacturing cost of the bearing while assuring the smooth, aligned rolling of the balls.

The invention also seeks to enhance the rigidity of the cage segments for making possible the manufacture of linear bearings of greater longitudinal dimensions than heretofore.

The invention also seeks to facilitate the assemblage of the linear bearing by providing a simplified means for retaining the cage segments in position.

Additionally the invention seeks to effectively seal the linear bearing against the intrusion of dust and other foreign matter in order to assure satisfactory performance over a long period of time under the most adverse conditions of use.

Stated broadly, the invention provides a recirculating-ball linear bearing comprising a body substantially in the shape of an inverted U in cross section having two opposed pairs of ball raceways of arcuate cross section formed longitudinally on the inner surfaces thereof and a ball return passageway formed longitudinally therethrough in the vicinity of each raceway. Attached to the opposite ends of the bearing body, a pair of end covers are each of substantially the same shape and size as the cross section of the bearing body and are each segmented into a pair of lateral halves. Each half of each end cover has formed therein two hairpin passageways or grooves each intercommunicating one reaceway and one adjacent return passageway in the bearing body. Thus are formed closed paths for the recirculation of respective groups of antifriction balls. The linear bearing further comprises a pair of separate cages each extending along one pair of raceways on the bearing body for rollably holding the antifriction balls thereon so as to allow them to make rolling engagement with a guide rail along which the bearing is to roll. Generally V-shaped in cross section, each cage is supported in position by having its opposite ends engaged in retainer grooves formed in the pair of end covers.

As is evident from the foregoing summary, the pair of end covers are each split into a pair of segments, which of course are each much smaller in size and simpler in shape than if they are integral. The production of the molds for the end cover segments, and the molding of these segments therein, are therefore both far easier than hitherto. Molded in the exact dimensions specified, the pair of segmented end covers with the hairpin passageways therein contribute materially to the smooth recirculation of the antifriction balls. The easier molding of the end covers also serves to reduce the manufacturing cost of the recirculating-ball linear bearing.

The same holds true with the pair of separate cages. The production of the separate cages by the pressing of sheet metal is far easier and less time-consuming than if they are integral, thus also contibuting to the cost reduction of the bearing. Further, since the separate cages are manufacturable to very close tolerances, they help to make smoother the rolling of the antifriction balls between the bearing body and the guide rail under load. It will also be appreciated that the pair of segmented end covers and the pair of discrete cages lend themselves to ready use with bearing bodies of different transverse dimensions intended for use with guide rails of matching widths.

Preferably each cage has a flange or flanges extending along one or both sides thereof for higher rigidity. Thus the pair of cages are both of Z-shape cross section in one embodiment of the invention and of W-shaped cross section in another. The improved rigidity of the cages makes it possible to increase the longitudinal dimension of the linear bearing as required. The Z- or W-sectioned cages, moreover, can be mounted in position simply as their opposite extremities are pressfitted in the retainer grooves of corresponding shape in the pair of end covers. This feature remarkably expedites the assemblage of the linear bearing.

An additional feature of the invention resides in means for sealing the opposite ends and opposite sides of the linear bearing aganst the intrusion of dust and other foreign matter. Thus rendered dustproof, the bearing will offer an extended period of trouble-free operation.

The above and other features and advantages of this invention and the manner of attaining them will become more apparent, and the invention itself will best be understood, from a study of the following description of the preferred embodiments illustrated in the attached drawings.

BRIEF DESCRIPTION OF THE DRAWINGS

FIG. 4 is a longitudinal section through the linear bearing, taken along the line IV—IV of FIG. 1;

FIG. 5 is a transverse section through the linear bearing, taken along the line V—V of FIG. 4, the linear bearing being herein also shown together with the guide rail;

FIG. 6 is a fragmentary section through the linear bearing, taken along the line VI—VI of FIG. 5, the view showing in particular one of the closed paths for the recirculation of the antifriction balls;

FIG. 4 is an end elevation of the guide rail for use with the linear bearing of FIG. 1;

FIG. 15 is a transverse section through a modification of the linear bearing of FIG. 1, the modified bearing being adapted for use with the wider guide rail shown;

FIG. 16 is an end elevation, partly in transverse section, of another preferred form of the recirculating-ball linear bearing in accordance with the invention, the bearing being shown together with a guide rail;

FIG. 17 is a side elevation of the linear bearing and guide rail of FIG. 16;

FIG. 18 is an internal elevation of one of the pair of segmented end covers in the linear bearing of FIG. 16;

FIG. 19 is a section taken along the line XIX—XIX of FIG. 18 and showing one of the end cover segments;

FIG. 20 shows in perspective and on an enlarged scale one of the end cover segments of FIGS. 18 and 19;

DESCRIPTION OF THE PREFERRED EMBODIMENTS

General

Figure 3:
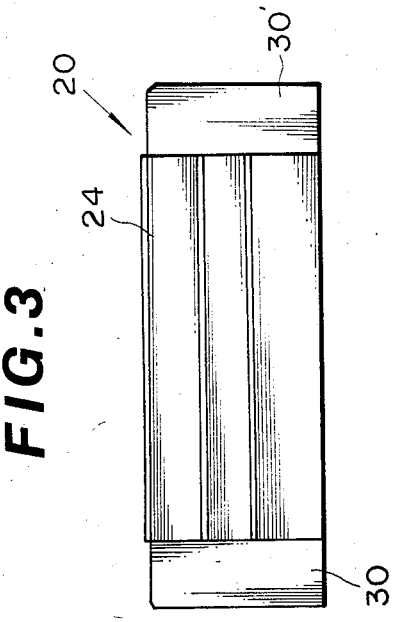
FIG. 3 is a right hand side elevation of the linear bearing of FIG. 1.
Figure 1:
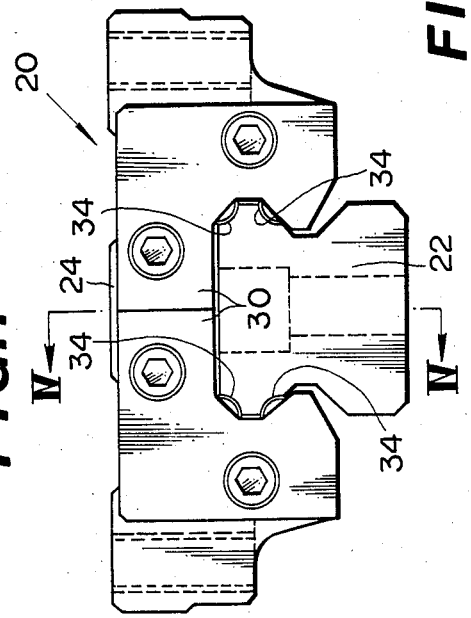
FIG. 1 is an end elevation of a first preferred form of the recirculating-ball linear bearing embodying the principles of this invention, the linear bearing being shown together with a guide rail along which it is to roll.

Of the above drawings FIGS. 1 to 14 illustrate the first preferred form of the recirculating-ball linear bearing in accordance with the invention. Reference is first directed to FIGS. 1 to 6 in particular in order to briefly explain the general organization of the linear bearing generally designated 20 therein. It will be noted that the linear bearing 20 is shown together with a guide rail 22 in FIGS. 1, 2, 5 and 6. Mounted astride this guide rail, the linear bearing 20 is to roll in either direction thereon.

The recirculating-ball linear bearing 20 seen in FIGS. 1 to 6 broadly comprises:

1. A body 24 substantially in the shape of an inverted U in cross section having two opposed pairs of ball raceways 26 and 26', FIGS. 5 and 6, of arcute cross section formed longitudinally on its inside surfaces, and two associated pairs of ball return passageways 28 and 28' extending longitudinally therethrough in the vicinity of, and parallel to, the respective pairs of raceways 26 and 26'.

2. A pair of segmented end covers 30 and 30', each of substantially the same shape and size as the cross section of the bearing body 24, screwed or otherwise fastened to the opposite ends of the bearing body, each end cover having four hairpin passageways or grooves 32 and 32', FIGS. 5 and 6, formed in its inside face each for intercommunicating one ball raceway 26, 26' and one adjacent ball return passageway 28, 28'.

3. Four groups of rolling antifriction balls 34 capable of separately recirculating along the four raceways 26 and 26' and through the four return passageways 28 and 28' in communication with each other via the respective hairpin passageways 32 and 32'.

4. A pair of cages 36 and 36', FIGS. 4 to 6, each extending along one pair of ball raceways 26, 26' for rollably holding the antifriction balls 34 thereon in a manner allowing their rolling engagement with the guide rail 22.

All but the antifriction balls of the listed components of the linear bearing 20, as well as the guide rail 22, will hereinafter be discussed in greater detail under the respective headings.

Bearing Body

Figure 7:
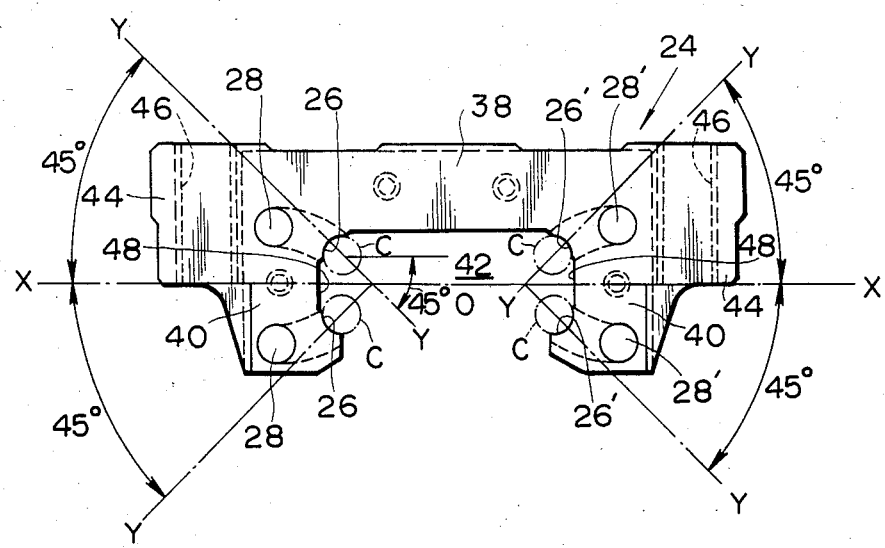
FIG. 7 is an end elevation of the body in the linear bearing of FIG. 1.

FIG. 7 is drawn to more clearly represent the geometry of the bearing body 24 constituting the basic load-bearing part of the recirculating-ball linear bearing 20. It comprises a generally flat bridge portion 38 to be laid horizontally on the guide rail 22, FIGS. 1, 2, 5 and 6, and a pair of aprons 40 depending from the opposite sides of the bridge portion throughout its length. The bridge portion 38 and the pair of aprons 40 may be considered to bound in combination a generally rectangular space designated 42. The bearing body 24 further includes a pair of wings 44 projecting laterally from its opposite sides. The wings 44 have a suitable number of mounting holes 46 formed vertically therethrough. These mounting holes are intended for use in attaching the bearing body to an object to be moved over the guide rail, by means of screws or other fastener elements passing therethrough.

The pair of aprons 40 of the bearing body have recesses 48 formed in their opposed inside surfaces, each recess extending throughout the length of the bearing body and being approximately trapezoidal in cross sectional shape. The noted two pairs of ball raceways 26 and 26' are each arranged on both sides of one of the recesses 48. Thus each pair of raceways are vertically spaced from and parallel to each other. Further, as viewed cross-sectionally, or in an end view as in FIG. 7, each raceway is curved with a radius approximately equal to that of each ball to roll thereon.

It will also be seen from FIG. 7 that each pair of raceways 26, 26' are arranged in bilateral symmetry with respect to a horizontal plane X—X passing the geometric center 0 of the aforesaid space 42 bounded by the bearing body 24. The letter C in FIG. 7 represents a notional circle of which the cross section of each raceway forms an arc. The plane Y—Y passing the longitudinal median line of each raceway and the center of the circle C associated therewith is at an angle of 45 degrees to the horizontal plane X—X. To turn this statement around is to say that the planes passing the longitudinal median lines of the four raceways 26 and 26' and the centers of the notional circles C are angularly spaced 90 degrees from each other.

Since each raceway 26, 26' is curved as aforesaid with a radius substantially equal to that of each ball to roll thereon, the notional circles C of FIG. 7 may be thought of as representing the balls 34 of, say, FIG. 5. With the raceways thus angled relative to each other, the linear bearing 20 when placed on the guide rail 22 via the balls 34 will most effectively bear the load acting thereon in all of upward, downward, rightward and leftward directions.

FIG. 7 also clearly reveals the placement of the two pairs of ball return passageways 28 and 28' extending longitudinally through the bearing body 24, or through its aprons 40. The diameter of each ball return passageway is made somewhat greater than that of each ball 34 in order that the balls may travel therethrough with minimal resistance. Each pair of return passageways 28, 28' lie in positions of bilateral symmetry with respect to the horizontal plane X—X.

While each pair of return passageways 28, 28' are more spaced from each other than are each pair of raceways 26, 26', nonetheless it will be seen that they are located inwardly of the planes Y—Y passing the longitudinal median lines of the associated pair of raceways 26, 26' and the centers of the circles C. This arrangement makes it possible to correspondingly reduce the vertical dimension of the bearing body 24 without appreciably affecting its strength or rigidity. The bearing body with its reduced vertical dimension posesses greater stability against external forces, particularly against those acting thereon in its transverse directions.

It should also be appreciated that the pair of aprons 40 of the bearing body 24 have each a very substantial thickness or transverse dimension. Thus, even though the two pairs of return pasageways 28 and 28' lie mostly in the aprons 40, they do not suffer any significant decrease in rigidity or strength. The great thickness of the aprons serves to enhance their rigidity and hence to prevent their outward deformation under load.

End Covers

Figure 8:
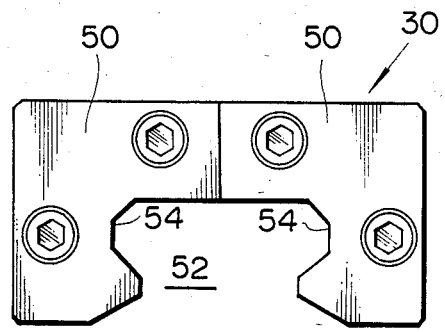
FIG. 8 is an external elevation of one of the pair of segmented end covers in the linear bearing of FIG. 1.
Figure 9:
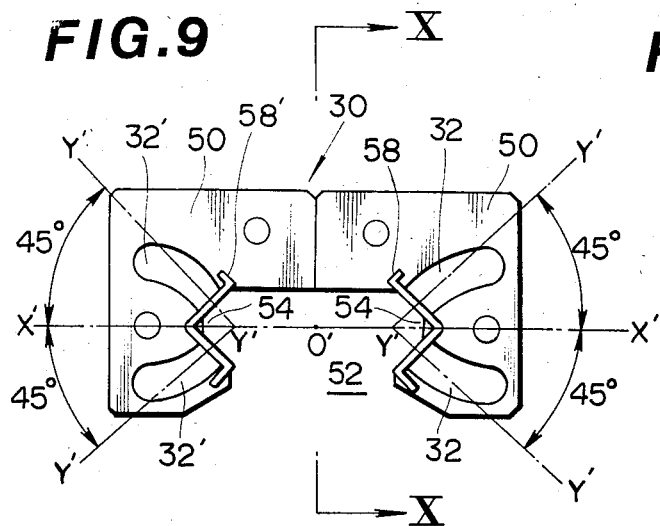
FIG. 9 is an internal elevation of the segmented end cover of FIG. 8.
Figure 10:
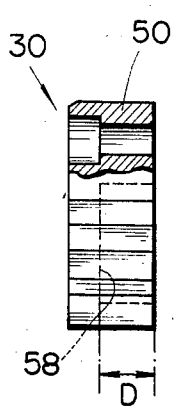
FIG. 10 is a section taken along the line X—X of FIG. 9 and showing one of the end cover segments.

FIGS. 8 to 10 illustrate one of the pair of end covers 30 and 30' fastened to the opposite ends of the bearing body 24. Since both end covers are of identical make, only one of them, 30, will be described in detail, it being understood that the same description applies to the other end cover 30'.

With particular reference to FIGS. 8 and 9, which show the outer and inner sides, respectively, of the representative end cover 30, it will be noted that the end cover is split into a pair of lateral halves or segments 50. The end cover segments are separately fabricated as by the injection molding of a synthetic resin or by the die casting of a metal or alloy. Each end cover segment is substantially in the shape of an L. In combination the two segments make up the inverted-U-shaped end cover 30. While the end cover is approximately of the same shape and size as the cross section of the bearing body 24, the inside edges of the end cover, bounding a generally rectangular space 52, particularly closely correspond in shape to the inside surfaces of the bearing body as viewed cross-sectionally. Thus the pair of depending portions of the end cover have recesses 54 cut in their opposed inner edges, which correspond to the recesses 48, FIG. 7, in the bearing body. Usually the end cover is attached to the bearing body as by cap screws 56 as best shown in FIG. 4.

Formed in the inner face of the end cover 30, which makes direct contact with one of the end faces of the bearing body 24, are the two pairs of hairpin passageways or grooves 32 and 32' intercommunicating the ball raceways 26 and 26' and the ball return passageways 28 and 28' in the manner best depicted in FIG. 6. The hairpin passageways 32 and 32' are curved not only in the plane of FIG. 6 but also in a plane at right angles therewith, as in FIG. 9.

As viewed in FIG. 9, each pair of hairpin passageways 32, 32' are bilaterally symmetrical with respect to the horizontal plane X'—X' passing the center 0' of the space 52 bounded by the inner edges of the end cover 30. This plane X'—X' coincides with the plane X—X of FIG. 7. A line Y'—Y' tangent to each hairpin passageway 32, 32' at its end open to one of the ball raceways on the bearing body is at an angle of 45 degrees to the horizontal plane X'—X'. Extending from this end toward the other, each hairpin passageway rather gently curves toward the horizontal plane X'—X' and terminates at the point where it opens to one of the ball return passageways in the bearing body.

It is thus seen that each hairpin passageway 32, 32' in the end cover 30 has its opposite ends open to one extremity of one ball raceway 26, 26' and to one extremity of one ball return passageway 28, 28', thereby serving as a hairpin curve therebetween. The other extremities of the ball raceways and the ball return passageways are of course understood to be likewise intercommunicated via similar hairpin passageways in the other end cover 30'. Accordingly each ball raceway and one adjacent ball return passageway in combination with two associated hairpin passageways make up a closed path, as in FIG. 6, for the recirculation of one group of antifriction balls.

The representative end cover 30 of FIG. 9 has also a pair of retainer grooves 58 and 58' formed in its inner face. Intended to closely receive one of the opposite longitudinal ends of one of the cages 36 and 36', each retainer groove 58, 58' has the exact cross sectional shape of each cage. The cross sectional shape of each cage 36, 36' is yet to be studied. The shape of each retainer groove will also become clear from the subsequent discussion of the cages. For the moment, therefore, suffice it to say that the retainer grooves 58 and 58' have portions extending across the respective pairs of hairpin passageways 32 and 32' at their ends open to the ball raceways on the bearing body. As indicated in FIG. 10, the retainer grooves 58 and 58' have a depth D greater than half the thickness of the end cover 30.

Cages

Figure 11:
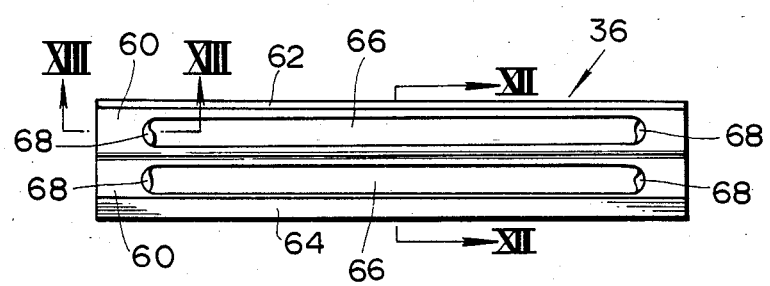
FIG. 11 is an elevation of one of the pair of cages in the linear bearing of FIG. 1.
Figure 12:
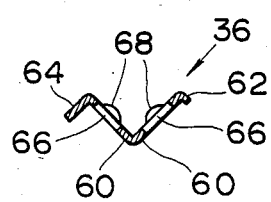
FIG. 12 is a section through the cage, taken along the line XII—XII of FIG. 11.
Figure 13:
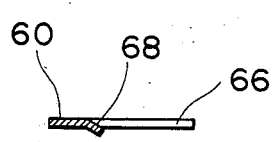
FIG. 13 is a fragmentary section through the cage, taken along the line XIII—XIII of FIG. 11.

FIGS. 11 to 13 are detailed representations of one of the pair of cages 36 and 36' for guiding the antifriction balls 34 along the respective pairs of raceways 26 and 26' on the bearing body. Both cages can be of identical design, so that only the cage 36 will be described in detail, with the understanding that the same description applies to the other cage 36'.

The representative cage 36 is fabricated by pressing a strip of steel or like rigid material into the shape of a V in cross section to provide a pair of divergent web portions 60. Further, in this particular embodiment, the cage 36 is formed to include flanges 62 and 64 extending along its opposite sides and bent approximately rightangularly therefrom. The flanges serve to add rigidity to the cage. As a whole, therefore, the cage 36 is of generally W-shaped cross section as best seen in FIG. 12. This cross-sectional shape of the cage corresponds to the shape of each retainer groove 58, 58' in each cover 30, 30'. The cage 36 is mounted just inwardly of the pair of raceways 26 on the bearing body 24 by having its opposite extremities pressfitted in the retainer grooves 58 in the end covers 30 and 30', as clearly shown in FIGS. 4 to 6.

Each of the divergent web portions 60 of the cage has a slot 66 formed longitudinally therein. Each slot 66 has a width appropriately less than the diameter of the antifriction balls 34. More specifically the width of each slot must be such that, rolling along one of the raceways 26 and 26', the antifriction ball partly project inwardly therethrough into rolling engagement with the guide rail 22 as in FIGS. 5 and 6.

The cage 36 is further formed to include a pair of tongues 68 at the opposite extremities of each slot 66. Each tongue 68 is bent away from the plane of the corresponding web portion 60 toward the guide rail 22, thereby forming an extension of one of the hairpin passageways in the end covers. As will be best understood upon inspection of FIG. 6, the tongues (therein designated 68') of the cage are intended to make possible the smooth transition of the antifriction balls 34 between the raceways on the bearing body and the hairpin passageways in the end covers.

Thus the pair of cages 36 and 36' with the tongues 68 and 68' perform the important function of buiding the antifriction balls along the raceways and to and from the hairpin passageways. Their rigidity and strength must be sufficiently high for that function. The steelmade cages may therefore be hardened by a suitable heat treatment.

FIG. 5 best depicts the attitudes of the pair of cages 36 and 36' when they are mounted in position on the bearing body 24, with their opposite ends engaged in the W-shaped retainer grooves in the pair of end covers. In these working positions the cages should have the longitudinal median lines of their slots contained in the planes Y—Y of FIG. 7.

Guide Rail

In FIG. 14 is shown, on a slightly enlarged scale, the guide rail 22 for the recirculating-ball linear bearing 20 constructed as in the foregoing. The guide rail can be of the type commonly referred to as the T rail, having a head 70, a web 72, and a base 74. Formed on the head 70 of the guide rail and extending longitudinally thereof are two pairs of ball raceways 76 and 76' for relative rolling engagement with the respective groups of antifriction balls 34 on the corresponding pairs of raceways on the bearing body.

As viewed cross-sectionally, or in an end view as in FIG. 14, each raceway on the guide rail 22 is also curved with a radius approximately equal to that of each antifriction ball. Further the planes passing the longitudinal median lines of the raceways 76 and 76' and the centers of the antifriction balls 34 in rolling engagement therewith are each set at an angle of 45 degrees to the plane of the horizon for the utmost load-bearing capacity of the linear bearing 20 in every possible direction of the action of the load.

Figure 2:
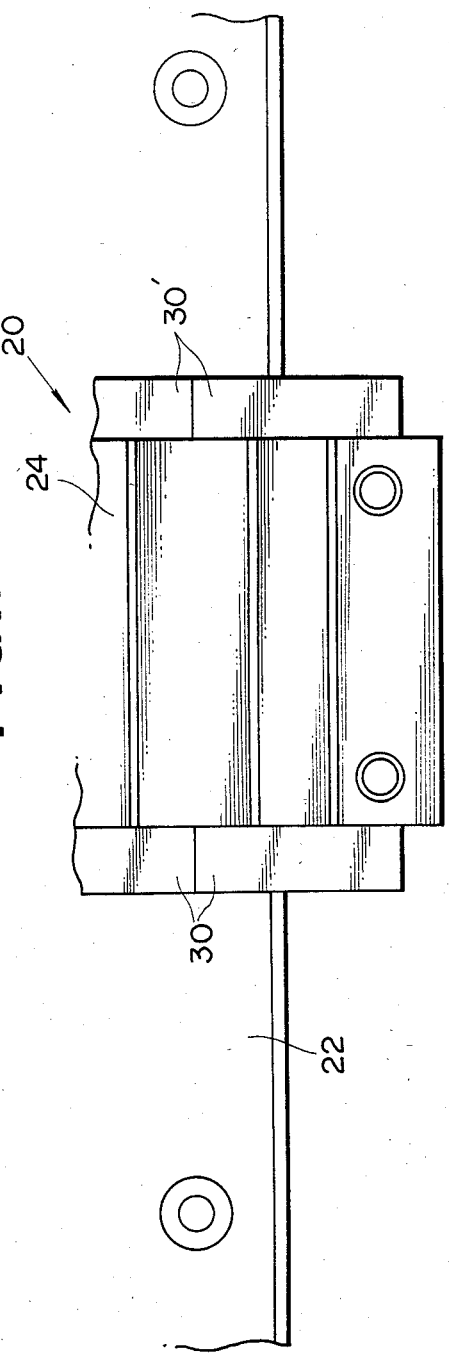
FIG. 2 is a fragmentary top plan of the linear bearing and guide rail.

The guide rail 22 has a required number of counterbored holes 78 created therethrough at longitudinal spacings, as seen also in FIG. 2. These holes are to receive suitable fastener elements in mounting the guide rail on the bed of a machine tool or on a desired part of any other piece of machinery.

Operation of the First Form

In the use of the recirculating-ball linear bearing 20 its body 24 is to be affixed to a desired object, by means of fastener elements passing the mounting holes 46 in its wings 44, which is to be moved relative to the part on which is laid the guide rail 22. As the linear bearing 20 travels in either direction along the guide rail 22, the four groups of antifriction balls 34 roll between the raceways 26 and 26' on the bearing body 24 and the raceways 76 and 76' on the guide rail 22 as guided by the pair of cages 36 and 36'. At the trailing end of the bearing the tongues 68 and 68' of the cages direct the successive balls into the hairpin passageways 32 and 32' in one of the end covers 30 and 30'. The load on the bearing is no longer transmitted to the balls as they flow into the hairpin passageways.

The antifriction balls subsequently enter the return passageways 28 and 28' in the bearing body and travel therethrough in the same direction as the traveling direction of the bearing relative to the guide rail. Then, via the hairpin passageways 32 and 32' in the end cover at the leading end of the bearing, the balls reenter the spaces between the raceways 26 and 26' on the bearing body and the raceways 76 and 76' on the guide rail, again bearing the load on the bearing 20.

As is evident from the foregoing, the four groups of antifriction balls 34 recirculate along the respective closed paths formed by the raceways 26 and 26' on the bearing body and the raceways 76 and 76' on the guide rail, the hairpin passageways 32 and 32' in the end covers, and the return passageways 28 and 28' in the bearing body. The direction in which the balls roll along these closed paths is of course subject to change depending upon the traveling direction of the bearing 20 on the guide rail 22.

Modification of the First Form

FIG. 15 shows the recirculating-ball linear bearing of this invention as adapted for a guide rail 22a of much greater width than that of the guide rail 22 in the preceding embodiment. The wide guide rail 22a is intended for use with a movable object 80 of correspondingly great transverse dimension which may form a part of a machine tool, office instrument, or any other machine or equipment.

Generally referenced 20a, the recirculating-ball linear bearing has only its body modified for use with the wide guide rail 22a. The bearing body is longitudinally split into a pair of halves 24a, although a unitary bearing body could be employed depending upon the rigidity of the movable object 80. The bearing body halves 24a are separately attached to the object 80 as by means of cap screws 82 and make rolling engagement with the guide rail 22a, each via two groups of antifriction balls 34.

It will be recalled that the linear bearing 20 of FIGS. 1 to 14 comprises the two separate cages 36 and 36' and the pair of end covers 30 and 30' each segmented into halves 50. These components of the bearing need no modification and lend themsleves to ready use in the split bearing 20a of FIG. 15. How the separate cages and the segmented end covers are combined with the split bearing body halves 24a will be self-evident from the foregoing description of the linear bearing 20 and upon consideration of FIG. 15.

The other details of construction of the modified linear bearing 20a can be identical with those of the bearing 20. Its operation is also as set forth above in conjunction with the preceding embodiment.

Second Form

FIGS. 16 to 26 illustrate a second preferred form of the recirculating-ball linear bearing in accordance with the invention. Generally designated 120 in FIGS. 16 and 17, the alternative linear bearing incorporates means for sealing the opposite ends and opposite sides of the bearing against the intrusion of dust and other foreign matter. Except for the dustproofing means the various parts of the linear bearing 120 mostly correspond to those of the bearing 20 of FIGS. 1 to 14. Such parts of the linear bearing 120 will therefore be identified by the same reference numerals as used to denote the corresponding parts of the bearing 20, only with the digit "1" prefixed to such numerals.

As will be noted from FIGS. 16 and 17, the linear bearing 120 comprises a body 124 of inverted-U-shaped cross section mounted astride a guide rail 122 via four groups (two seen in FIG. 16) of antifriction balls 134. Rolling along the opposed raceways on the bearing body 124 and on the guide rail 122, the balls 134 are confined by a pair of cages 136 which are slightly different in shape from the cages 36 and 36' of the FIGS. 1 to 14 embodiment. A pair of end covers 130 and 130' fastened to the opposite ends of the bearing body 124 are also slightly modified in their inside surface configurations. Both cages 136 and end covers 130 and 130' will therefore be described in further detail subsequently.

The linear bearing 120 particularly features a pair of end seals 190 and 190' and a pair of side seals 192 and 192'. The constructions, arrangements, and functions of these sealing means will also be detailed presently.

FIGS. 18 to 20 are detailed illustrations of one of the end covers, herein designated 130, the other end cover 130' being of analogous design. The representative end cover 130 is segmented into a pair of lateral halves 150 each having a pair of hairpin passageways 132, 132' and a retainer groove 158, 158' formed in its inside surface. While the hairpin passageways 132 and 132' are identical with those of the FIGS. 1 to 14 embodiment, the retainer grooves 158 and 158' are slightly modified in shape to conform to the modified cross-sectional shape of the cages 136 yet to be explained.

At 194 are shown a pair of grooves extending from semicircular recesses 196 in the opposed inner edges of the end cover halves 150 to the upper hairpin passageways 132 and 132'. These grooves 194 serve to direct grease into the ball paths of the bearing. The recesses 196 combine to form a hole for the reception of a grease nipple 198 seen in FIG. 17.

Figure 21:
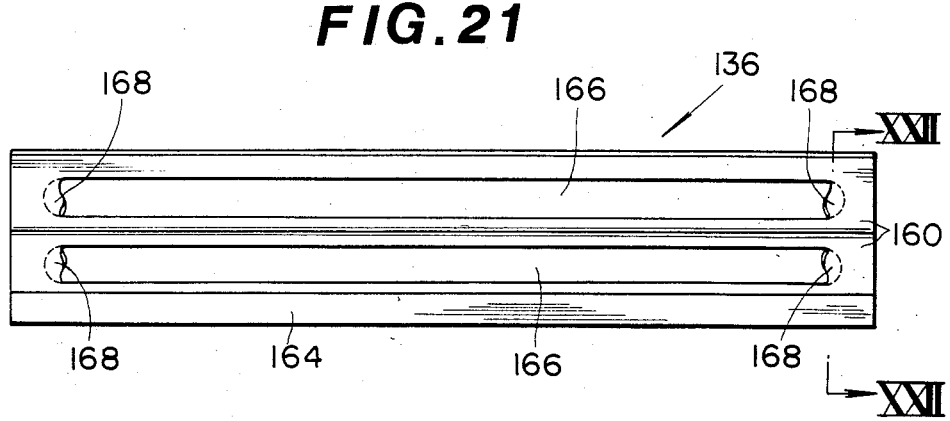
FIG. 21 is an elevation of one of the pair of cages in the linear bearing of FIG. 16.
Figure 22:
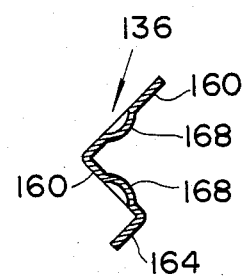
FIG. 22 is a transverse section through the cage, taken along the line XXII—XXII of FIG. 21.

With reference to FIGS. 21 and 22 each cage 136 is similar to the cages 36 and 36' in having a pair of divergent web portions 160, with a slot 166 formed longitudinally in each web portion, and a pair of tongues 168 at the opposite extremities of each slot. However, unlike the cages 36 and 36', each cage 136 has only one flange 164 formed along one of its sides. Each cage is thus approximately Z-shaped in cross section. In the completed linear bearing 120 the pair of cages 136 are supported interiorly of the bearing body 124 by having opposite ends closely engaged in the retainer grooves 158 and 158' of corresponding shape, FIGS. 18 to 20, in the pair of end covers 130 and 130', as in the previously disclosed embodiments.

Figure 23:
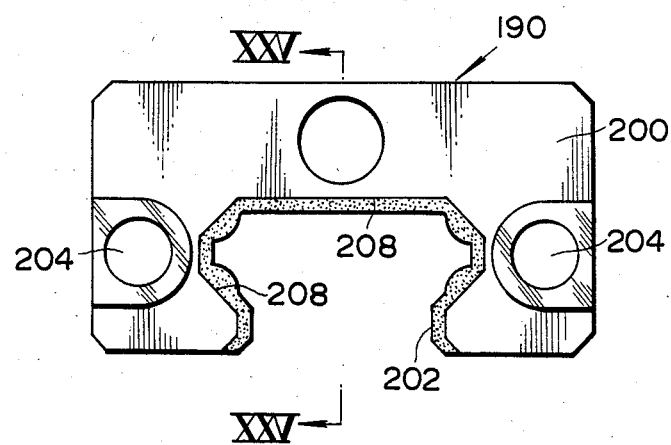
FIG. 23 is an elevation of one of the pair of end seals in the linear bearing of FIG. 16.
Figure 24:
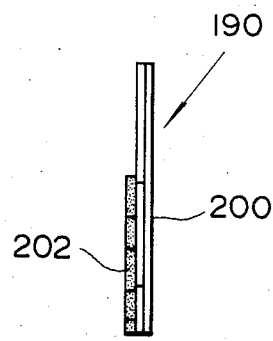
FIG. 24 is a right hand side elevation of the end seal of FIG. 23.
Figure 25:
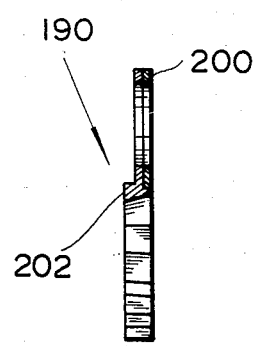
FIG. 25 is a section through the end seal, taken along the line XXV—XXV of FIG. 23.

As illustrated in detail in FIGS. 23 to 25, each of the pair of end seals, therein designated 190 for simplicity, comprises a holder plate 200 and a sealing strip 202 of rubber or like elastic, wear-resistant material. Made of steel or like rigid material, the holder plate 200 has the same shape and size as each end cover 130, 130'. A suitable number of mounting holes 204 are created through the holder plate 200 for the passage of fastener elements 206, FIG. 16, by which the holder plate is attached to one end of the bearing body 124 via one of the end covers 130 and 130'.

The sealing strip 202 is affixed to the inside edges 208 of the holder plate 200 as by baking. As clearly shown in FIG. 16, the sealing strip 202 makes sliding engagement with the guide rail 122 thereby preventing the intrusion of foreign matter into the linear bearing 120 through one of its ends. The other end of the bearing is of course likewise sealed by the other end seal 190'.

Figure 26:
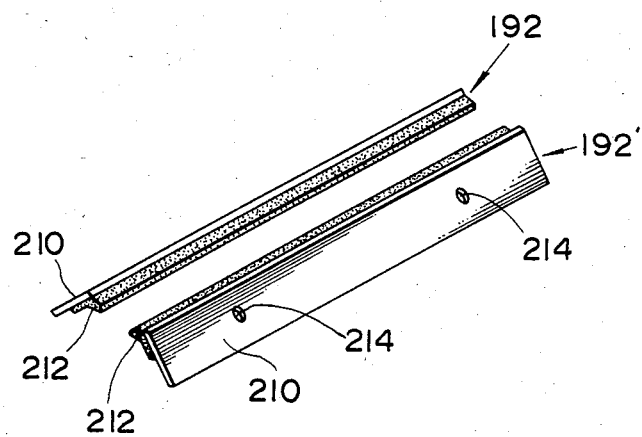
FIG. 26 shows in perspective the pair of side seals in the linear bearing of FIG. 16.

FIG. 26 shows in perspective the pair of side seals 192 and 192'. Each side seal comprises a rectangular holder plate 210 of steel or the like and a sealing strip 212 of rubber or the like. Each holder plate 210 has a length equal to the length of the bearing body 124 plus the total thickness of the pair of end covers 130 and 130'. At least two mounting holes 214 are formed through each holder plate 210 for receiving fastener elements, by which the holder plate is attached to the bottom of one of the opposite side aprons of the bearing body 124 so as to project inwardly therefrom.

L-shaped in cross section, the sealing strips 212 are secured to and extend along the inner edges of the holder plates 210. As shown in FIG. 16, the sealing strips make sliding engagement with the opposite sides of the guide rail 122 for preventing the intrusion of foreign matter into the linear bearing 120 from the opposite sides of the guide rail.

The other structural and operational details of the linear bearing 120 can be as set forth above in connection with the linear bearing 20 of FIGS. 1 to 14. The advantages gained thereby are also considered self-evident from the foregoing.

It will, of course, be understood that various changes may be made in the form, details, arrangements, and proportions of the parts without departing from the scope of the invention as set forth in the appended claims.

What is claimed is:

1. A recirculating-ball linear bearing capable of withstanding the load acting thereon in four orthogonal directions, comprising:
   (a) a body of substantially inverted-U-shaped cross section having two opposed pairs of raceways of arcuate cross section formed longitudinally on inner surfaces thereof, each pair of raceways being vertically spaced from and angled toward each other, the body also having a return passageway formed longitudinally therethough in the vicinity of each raceway, the body comprising a bridge portion and a pair of aprons depending from its opposite sides, and wherein the aprons have a sufficient thickness to have the return passageways formed therethough without suffering a substantial decrease in strength or rigidity;
   (b) a pair of end covers secured to the opposite ends of the body, each end covering being of substantially the same shape and size as the cross section of the body and being segmented into a pair of lateral halves, each half of each end cover having formed therein two hairpin passageways each inter-communicating one raceway and one adjacent return passageway in the body, each half of each end cover also having a retainer groove formed therein;
   (c) a group of recirculating antifriction balls capable of rolling along each raceway and through one adjacent return passageway communicated therewith via the hairpin passageways, each raceway on the body being, as viewed cross-sectionally, curved with a radius approximately equal to the radius of each antifriction ball, and wherein the planes passing the longitudinal median lines of the raceways and the centers of the antifriction balls thereon are angularly spaced 90 degrees from each other, the return passageways associated with each pair of raceways on the body being disposed inwardly of the planes passing the longitudinal median lines of the raceways and the centers of the antifriction balls thereon so as to reduce the vertical dimension of the body, each of said two hairpin passageways in each end cover being curved away from the assocated raceway toward the associated return passageway while departing gradually away from the planes passing the longitudinal median lines of the raceways and the centers of the antifriction balls thereon; and
   (d) a pair of cages extending along one pair of raceways on the body for rollably holding the antifriction balls thereon and supported in position by having the opposite ends thereof closely engaged in the retainer grooves in the pair of end covers, each cage being in the form of a strip of rigid material bent substantially into the shape of a V in cross section to provide a pair of divergent web portion of each cage having formed therein a slot extending along one raceway on the body having width less than the diameter of each antifriction ball to allow the antifriction balls to partly project inwardly therethrough as they roll along the raceway.

2. The recirculating-ball linear bearing as recited in claim 1, wherein each cage has a pair of tongues formed at the opposite extremities of each slot therein for the smooth rolling motion of the antifriction balls between the corresponding one of the raceways on the body and the associated hairpin passageways in the end covers.

3. The recirculating-ball linear bearing as recited in claim 1, wherein each cage has a flange formed at least on one side thereof for higher rigidity.

4. The recirculating-ball linear bearing as recited in claim 1, wherein the body is longitudinally split into a pair of halves.

5. The recirculating-ball linear bearing as recited in claim 1, further comprising:
   (a) first sealing means for sealing the opposite ends of the bearing against the intrusion of foreign matter; and
   (b) second sealing means for sealing the opposite sides of the bearing against the intrusion of foreign matter.

6. The recirculating-ball linear bearing as recited in claim 5, wherein the first sealing means comprises:
   (a) a pair of holder plates secured to the pair of end covers respectively, each holder plate being of approximately the same shape and size as the cross section of the body; and
   (b) a sealing strip of elastic, wear-resistant material secured to and extending along inner edges of each holder plate.

7. The recirculating-ball linear bearing as recited in claim 5, wherein the second sealing means comprises:
   (a) a pair of holder plates secured to the lower ends of the opposite sides of the body; and
   (b) a sealing strip of elastic, wear-resistant material secured to an extending along an inner edge of each holder plate.

8. The recirculating-ball linear bearing as recited in claim 1, in combination with a guide rail along which the linear bearing is to roll, the guide rail having a head having formed thereon two pairs of raceways of arcuate cross section for relative rolling engagement with the respective groups of antifriction balls projecting out of the slots in the cages.

9. The recirculating-ball linear bearing as recited in claim 8, wherein each raceway on the head of the guide rail is, as viewed cross sectionally, curved with a radius approximately equal to the radius of each antifriction ball, and wherein the planes passing the longitudinal median lines of the raceways on the head of the guide rail and the centers of the antifriction balls in rolling engagement therewith are angularly spaced 90 degrees from each other.

* * * * *